United States Patent Office 3,686,155
Patented Aug. 22, 1972

3,686,155
NOVEL PROCESS FOR COPOLYMERIZATION OF ALPHA OLEFINS AND ETHYLENE
Joseph Wagensommer, 57 Barchester Way, Westfield, N.J. 07090
No Drawing. Filed Apr. 10, 1970, Ser. No. 27,436
Int. Cl. B01j; C08f 15/40
U.S. Cl. 260—88.2
13 Claims

ABSTRACT OF THE DISCLOSURE

This invention is directed to a novel process for preparing copolymers of ethylene and certain alpha olefins (including terpolymers with dienes) by reaction in the presence of vanadium and titanium catalysts together with aluminum cocatalysts.

BACKGROUND OF THE INVENTION

This invention relates to a process for preparing polymeric compositions. More specifically, it relates to a novel process for producing polymers particularly characterized by their improved properties.

As is well known to those skilled in the art, copolymers of ethylene and higher alpha olefins such as propylene with other polymerizable monomers have been prepared. Typical of these other monomers may be non-conjugated dienes such as 1,4-hexadiene or 5-ethylidene-2-norbornene. It has, however, been found that many prior art polymers so prepared have been characterized by low rates of extrusion and have tensile strengths which have not been as high as desired.

It is an object of this invention to provide a process for preparing a copolymer of ethylene, a higher alpha olefin, and preferably a non-conjugated alkadiene.

It is another object of this invention to provide a polymer characterized by improved properties.

Other objects will be apparent to those skilled in the art on inspection of the following description.

SUMMARY OF THE INVENTION

In accordance with certain of its aspects, the novel process of this invention for preparing a copolymer of ethylene and a $C_3$ to $C_{10}$ higher alpha olefin may comprise:

(a) Forming a charge mixture of ethylene and a $C_3$ to $C_{10}$ higher alpha olefin;

(b) Forming, in a halogenated hydrocarbon solvent in the absence of cocatalyst, a catalyst mixture consisting essentially of $VX_4$ wherein X is halide having an atomic number greater than 9, and $Ti(OR)_4$ wherein R is a hydrocarbon moiety, thereby forming a catalyst mixture;

(c) Contacting said charge mixture in a reaction zone with a catalytic amount of (i) said catalyst mixture in said halogenated hydrocarbon solvent and of (ii) a compound $R'_aAlY_{3-a}$, as cocatalyst, wherein R' is a hydrocarbon moiety, a is an integer 1–3, and Y is a halide having an atomic number greater than 9, thereby forming a copolymer of ethylene and a $C_3$–$C_{10}$ alpha olefin; and (d) Withdrawing said copolymer as product.

DESCRIPTION OF THE INVENTION

The ethylene used in practice of this invention as first monomer may typically be purified commercially available ethylene of greater than 99.98% purity, typically 99.98% to 99.999%, say 99.99%. It may contain less than 0.02%, typically 0.001% to 0.02%, say 0.01% non-olefinic impurities and less than 0.001%, say 0.0001% to 0.0005% water.

The higher alpha olefin, also called a terminal olefin, which may be used in the practice of this invention as a second monomer, may be purified commercially available $C_3$ to $C_{10}$ olefin having a purity of greater than 99.98%, typically 99.98% to 99.999%, say 99.99%. It may contain less than 0.02%, say 0.001% to 0.02%, say 0.01% nonolefinic impurities and less than 0.001%, say 0.0001% to 0.0005% water. Nonpolar impurities, such as ethane or other hydrocarbons, may be present, but for best results, polar compounds such as oxygen, water, carbon monoxide, carbon dioxide, etc., may be maintained at or below the indicated low level in the ethylene and alpha olefin field.

The higher alpha olefins having three to ten carbon atoms may be designated by the formula $R'$—$CH$=$CH_2$ wherein R' is hydrocarbon and typically alkyl including cycloalkyl. Alpha olefins may include typically:

TABLE I

| | |
|---|---|
| 3-methyl butene-1 | octene-1 |
| hexene-1 | 3-methyl heptene-1 |
| 3-methyl pentene-1 | 4-methyl heptene-1 |
| 4-methyl pentene-1 | 5-methyl heptene-1 |
| heptene-1 | 6-methyl heptene-1 |
| 3-methyl hexene-1 | 3-ethyl hexene-1 |
| 4-methyl hexene-1 | 4-ethyl hexene-1 |
| 5-methyl hexene-1 | 3-propyl hexene-1 |
| 3-ethyl pentene-1 | decene-1 |

The preferred higher alpha olefins may be propylene, i.e. propene.

The non-conjugated diolefins which may be third monomer components of the copolymers of this invention may preferably include those having 5–14 carbon atoms. Typical of the non-conjugated diolefins may be the following:

(A) Straight chain acyclic dienes such as: 1,4-hexadiene; 1,6-octadiene.

(B) Branched chain acyclic dienes such as: 5-methyl 1,4-hexadiene; 3,7-dimethyl 1,6-octadiene; 3,7-dimethyl 1,7-octadiene; and the mixed isomers of dihydro-myrcene, and dihydro-ocimene.

(C) Single ring alicyclic dienes such as: 1,4-cyclohexadiene; 1,5-cyclo-octadiene; and 1,5-cyclododecadiene.

(D) Multi-ring alicyclic fused and bridged ring dienes such as: tetrahydroindene; methyltetrahydroindene; dicyclopentadiene; bicyclo (2,2,1) hepta 2,5-diene; alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-isopropylidene-2-norbornene, 5-(4-cyclopentenyl)-2-norbornene; 5-cyclohexylidene-2-norbornene The preferred third monomer may be 5-ethylidene-2-norbornene (ENB).

Formation of the novel copolymers of this invention may be effected by forming a mixture of the monomer components containing the following components by weight, these being per 100 parts of solvent:

TABLE II

| Component | Broad range | Preferred range | Typical |
| --- | --- | --- | --- |
| Ethylene | 0.1–10.0 | 1.0–6.0 | 2.5 |
| Higher alpha olefin | 0.1–20.0 | 1.0–12.0 | 6.2 |
| Diolefin | 0.0–1.0 | 0.0–0.6 | 0.22 |

Mixtures of these monomers may be used, i.e. more than one alpha olefin and/or more than one diolefin may be employed. It will be noted that when only ethylene and higher alpha olefin are present, the product may be a two-component polymer; when the diloefin is present, the copolymer is a terpolymer. Other compatible components, including those which are copolymerizable to form tetrapolymers, may be present.

The monomer mixture may be polymerized (either batch-wise or continuously) in the presence of a catalyst composition containing catalyst and cocatalyst. Preferably, the catalyst composition may consist essentially of $XV_4$ wherein X is halide having an atomic number greater than 9 and $Ti(OR)_4$ wherein R is a hydrocarbon moiety. In the component $XV_4$, X may typically be chlorine, bromine, or iodine, and most preferably chlorine. The preferred composition may be vanadium tetrachloride, $VCl_4$.

In the catalyst composition, the compound $Ti(OR)_4$ may be one wherein R may be a hydrocarbon moiety, typically alkyl, aryl, alkaryl, and aralkyl. When R is alkyl, it may be methyl, ethyl, propyl, i-propyl, n-butyl, i-butyl, t-butyl, hexyl, cyclohexyl, octyl, etc. When R is aryl, it may be phenyl, naphthyl, etc. When R is alkaryl, it may be tolyl, xylenyl, etc. When R is aralkyl, it may be benzyl, β-phenyl ethyl, etc. The R group may be inertly substituted, i.e. it may bear a substituent which does not react with the other components of the process or interfere with the reaction. Typical inert substituents may include halogen, aryl, alkyl, etc. Typical inertly substituted R radicals may include chlorophenyl, 2-ethyl-hexyl, methylcyclohexyl, etc. All the R groups in a particular compound need not be the same; preferably, however, they may be the same. Preferably, R may be alkyl, and more preferably, lower alkyl having 1 to 10 carbon atoms, and, most preferably, butyl.

Preferably, the catalyst mixture may be formed by mixing 1 to 10, say 2 moles of $VX_4$ with 0.5 to 5.0, say 1.0 moles of $Ti(OR)_4$. The preferred catalyst composition may consist essentially of 2 moles of vanadium tetrachloride $VCl_4$ and 1 mole of tetrabutyl titanate $Ti(OBu)_4$.

It is a feature of the process of this invention that the catalyst mixture be formed in a halogenated, preferably a chlorinated, hydrocarbon, A. Typically, halogenated (aliphatic or aromatic) hydrocarbon solvent A which may be employed may include perhalogenated compounds such as carbon tetrachloride, hexachloroethane, etc. The preferred halogenated solvents may be those which have a melting point below about 10° C. and which have an atmospheric boiling point above about 30° C. Typical illustrative solvents which may be employed may be carbon tetrachloride, chloroform, chlorobenzene, tetrachloroethylene, $$CHCl_2—CHCl_2$$

etc. Commercial mixtures of these halogenated hydrocarbons may be employed. The preferred compositions which may be used as halogenated hydrocarbon solvents may be those containing less than about 5% to 15%, say 10% of non-aromatic hydrocarbon impurities. Commonly, the solvent employed may contain less than 10% aliphatic hydrocarbons. Commercially available halogenated hydrocarbon solvents may be employed, including those sold as carbon tetrachloride and which are substantially free of water and polar compounds.

The preferred halogenated hydrocarbon solvent may be tetrachloroethylene, $Cl_2C=CCl_2$, preferably as commercially available having a purity of 95%–99%. It will be apparent to those skilled in the art that the halogenated hydrocarbon solvent which may be employed should be substantially free of materials which will react with other components in the system, especially water, oxygenated compounds, etc.

In carrying out the process of this invention, the catalyst components may be added to 100 parts of halogenated hydrocarbon solvent typically at 10° C. to 80° C., say 20° C. Typically, there may be added 0.2 to 0.8, say 0.5 part of $XV_4$ and 0.2 to 0.8 part, say 0.44 part of $Ti(OR)_4$ to form a mixture, and preferably a solution, in the halogenated hydrocarbon solvent, containing 0.4 to 1.6 parts, say 1.2 parts total of catalyst mixture.

It is a feature of the novel process of this invention in its preferred aspects that the catalyst mixture consisting essentially of $VX_4$ and $Ti(OR)_4$ be formed in the halogenated hydrocarbon solvent in the absence of the aluminum cocatalysts used during the polymerization reaction. In practice of the preferred embodiment, the catalyst mixture (of $VX_4$ and $Ti(OR)_4$) will not come into contact with the aluminum cocatalyst prior to the in situ reaction in the reaction zone.

Presence of the aluminum cocatalyst composition in or with the halogenated hydrocarbon solvent prior to the addition thereto and reaction therein of the vanadium and titanium components of the catalyst mixture may effectively substantially reduce the activity of the catalyst composition in terms of the number of pounds of product polymer produced per pound of catalyst used if the preferred sequence is not followed. Furthermore, blending of the aluminum cocatalyst with the halogenated hydrocarbon solution of the catalyst complex may also significantly reduce the yield of desired product.

It is also a feature of the novel system of this invention that when the vanadium and titanium components of the catalyst mixture are added to the halogenated hydrocarbon solvent, substantial heat of reaction may be observed, indicating the formation of a new catalytic species by chemical reaction. As is well known to those skilled in the art, evolution of heat of reaction and formation of new catalytic species is not a feature of reported prior art techniques; and it may be the presence of this novel composition which imparts to products and process of this invention at least some of their unusual characteristics.

In accordance with certain of its aspects, this invention is directed to a polymerization catalyst composition comprising a complex $VX_4 \cdot bTi(OR)_4$, wherein X is halide having an atomic number greater than 9, $b$ is 0.1–5.0, typically about 0.5, and R is a hydrocarbon moiety, dissolved in a halogenated hydrocarbon solvent. The complex formed in the presence of halogenated hydrocarbon A may be obtained as a complex $VX_4 \cdot bTi(OR)_4 \cdot nA$ in an excess of solvent-complexing agent A. $n$ may typically be a small 0.5–3.0, and preferably 1. The preferred complexes may be $$VCl_4 \cdot Ti(OBu)_4 \cdot CCl_4$$

$$VCl_4 \cdot Ti(OBu)_4 \cdot C_6H_5Cl$$

$$VCl_4 \cdot Ti(OBu)_4 \cdot CCl_2=CCl_2$$

etc.

The aluminum cocatalyst compound which may be used in the practice of the process of this invention may be a compound $R'_aAlY_{3-a}$, wherein R' is a hydrocarbon moiety, $a$ is an integer 1–3, and Y is a halide having an atomic number greater than 9. The hydrocarbon moiety R' may be selected from the same group as that from which hydrocarbon moiety R may be selected. The preferred R' moiety may be ethyl. Preferably $a$ is 2. Y may be a halide, typically chloride, bromide or iodide and, most preferably, chloride. The preferred aluminum cocatalyst may be diethyl aluminum chloride.

The relative amounts of the catalyst and the cocatalyst in the catalytic mixture used in the process may be such that the molar ratio of aluminum compound to the vanadium-titanium complex may be 0.5–50, preferably 2–20, say 5.

Polymerization may be effected by passing 0.1 to 10, say 2.5 parts of ethylene, 0.1 to 20, say 6.2 parts of alpha olefin, typically propylene, and 0 to 1.0 say 0.17 part of diolefin third monomer, typically 5-ethylidene-2-norbornene, ENB, when employed, into 100 parts of liquid inert solvent diluent reaction medium containing catalyst and cocatalyst in catalytic amounts, i.e. 0.0005–0.25, say 0.01 part of catalyst and 0.001–0.20, say 0.05 part of cocatalyst per 100 parts of reaction medium. The nonreactive reaction medium may be an aromatic hydrocarbon such as toluene, a saturated aliphatic hydrocarbon such as heptane, cycloaliphatics such as cyclohexane, or a halohydrocarbon such as tetrachloroethylene. All steps in this reaction should preferably be carried out in the absence of oxygen, moisture, carbon dioxide or other harmful materials. Preferably, all reactants and catalysts may be pure and dry and blanketed with inert gas such as nitrogen or argon.

In the preferred embodiment, the nonreactive reaction medium may preferably be totally miscible with the halogenated hydrocarbon solvent in which the catalyst mixture has been formed.

In the preferred embodiment, the polymerization reaction may be carried out by separately feeding to the polymerization step the charge mixture of ethylene and higher alpha olefin together with diolefin, when used, the cocatalyst and the halogenated hydrocarbon solvent containing the catalyst. During polymerization, the reaction mixture may be agitated and maintained at temperatures of −40° C. to 200° C., say −10° C. to 100° C., preferably about 30° C. and pressures of 0–1000 p.s.i.g., preferably 0–600 p.s.i.g., say 60 p.s.i.g., during a period of 1–300 minutes, preferably 3–60 minutes, say 15 minutes.

At the end of this period, polymerization may be found to be complete. The catalyst may be deactivated as by addition of an alcohol such as isopropanol or butanol. The mixture may be deashed by mixing with aqueous hydrochloric acid; and the organic layer may be separated and stripped to yield a residue of copolymer. The copolymer may be obtained in an amount of 1–10 parts, say 5 parts corresponding to 95% to 98%, say 97% yield based on ethylene.

The polymer of this invention may contain two components or three components. When it is a two-component copolymer, preferably the ethylene component may be present in amount of 20–85 parts, preferably 50–80 parts, say 70 parts, and the higher alpha olefin, preferably propylene, may be present in amounts of 15–80 parts, preferably 20–50, say 30 parts. When it is a terpolymer, preferably the ethylene component may be present in amounts of 20–85 parts, preferably 50–80 parts, say 70 parts, the higher alpha olefin component may be present in amounts of 15–80 parts, preferably 20–50 parts, say 30 parts, and the third component, typically 5-ethylidene-2-norbornene, may be present in amounts of 0–25 parts, preferably 0.5–15 parts, say 3 parts. Other copolymerized monomers may also be present including butene-1, etc. The product may typically have a number average molecular weight $\overline{M}_n$ of 50,000–200,000 as determined by osmometry.

The novel terpolymer produced by the process of this invention may have a desirably high number average molecular weight. This factor is important because it contributes to tensile strength of the polymer.

The tensile strength of the product may be found to be about 5% to 20% above typical comparable prior art values.

It is a particular feature of the product of this invention that it may be formulated and compounded to produce a product which is unexpectedly characterized by an extrusion rate which may be 5 to 10% greater than the extrusion rate of the best commercially available comparable products presently known. This is a significant improvement in that it directly means that product can be extruded at substantially higher rates than has heretofore been possible.

The product may readily be blended with a variety of oils, carbon blacks, clays and silicas. Typical carbon blacks may include those commercially available under the designations SAF, SRF, HAF, FEF, and MPC. The carbon black in amounts of 0–500 or more, preferably 0–200 parts by weight, may be blended with 100 parts of polymer; and 0–200 parts of oil may also be added.

An additional unusual feature of this invention is that the copolymer produced with the novel catalyst may be cured to high tensile strength even in the presence of carbon black filler having a large particle size. For example, tensile strength in excess of 900 p.s.i. may be obtained when the cured polymer contains 150–300 parts by weight of a coarse carbon black having an average particle size of 0.1–0.5 micron and 50–150 parts of an extender oil.

The novel products of this invention may be used in a wide variety of end uses. Typically, they may find use in molded, formed, or coated products including sponges, tires and inner tubes, footwear, cable coatings, hoses and tubings, belts, etc.

DESCRIPTION OF THE PREFERRED EMBODIMENTS

Practice of this invention may be illustrated by the following examples wherein, as elsewhere in this description, all parts are by weight unless otherwise indicated.

EXAMPLE 1

In this example, which represents practice of the process of this invention, the catalyst may be prepared by mixing 19.3 parts of vanadium tetrachloride (0.1 mole) and 17 parts (0.05 mole) of tetrabutyl titanate in 123 parts of tetrachlorethylene $CCl_2=CCl_2$ to provide a homogeneous catalyst solution containing 18.15 grams of catalyst per 100 ml. catalyst solution. The reaction may be exothermic due to formation of the complex

$$VCl_4 \cdot 0.5Ti(O\text{-Butyl})_4 \cdot CCl_2=CCl_2$$

and in this instance it may be found that the temperature of the mixture may rise from room temperature of about 27.5° C. up to 48.5° C., substantially instantaneously.

The polymerization may be carried out by passing to the polymerization reaction vessel per 100 parts of diluent, 2.73 parts of ethylene, 10.0 parts of propylene, and 0.0188 part of the catalyst mixture in tetrachlorethylene, and 0.0485 part of diethyl aluminum chloride cocatalyst in a 2.8% (wt.) solution in hexane.

Reaction may be conducted at 30° C. and 60 p.s.i.g. for an effective residence time of 13.5 minutes during which the reactants may be subjected to agitation. All reactants and vessels may be maintained pure, dry, and anaerobic.

At the conclusion of a polymerization run, the products may be removed from the reaction vessel and the catalyst deactivated by addition of 0.5 part of isopropanol. The reaction mixture may be mixed with dilute hydrochloric acid and the tetrachlorethylene layer separated. Solvent may be stripped at 121° C. to yield product polymer.

The product may be analyzed and the analyses set forth in Table III together with other significant process conditions.

The specific process conditions set forth in the various tables may include the following:

(1) Al/V+Ti—The molar ratio of the aluminum cocatalyst to the sum of the moles of the vanadium catalyst and the titanium catalyst.

(2) Rate—The rate of polymerization in grams per hour was also determined.

(3) Efficiency—The catalyst efficiency was determined in terms of pounds of polymer produced per pound of $VCl_4$ present in the catalyst.

(4) Conversion—The percent of ethylene and separately the percent of propylene admitted to the reaction vessel, which was converted to polymer product, was measured.

(5) $C_2$ Comp.—The weight percent of ethylene in the polymer composition was measured by infrared spectroscopy.

(6) I.V.—The inherent viscosity of the polymer product was determined in Decalin at 135° C. by standard methods.

(7) $M_L$—The Mooney Viscosity at 260° F. was determined using a large #1 rotor for 8 minutes.

In Table III which follows, the results of Example 1 are set forth. In the Examples 2–4, the same conditions as used in Example 1 were followed except where, as shown, the diluent, the ENB feed, the catalyst quantity, or the Al/V+Ti ratio was changed. In Examples 1 and 2, the diluent was tetrachlorethylene $CCl_2=CCl_2$. In Examples 3 and 4, the diluent was monochlorobenzene $C_6H_5Cl$. Examples 1 and 2 were carried out in a three gallon reactor and Examples 3 and 4 were carried out in a two gallon reactor—this accounts for the difference in the determined rate. All reactions were carried out at 25° C. and the residence time in all cases was about 13.5 minutes.

TABLE III

| Example No. | Feed, lbs./100 lbs. diluent solvent | | | | |
|---|---|---|---|---|---|
| | Ethylene | Propylene | ENB | Catalyst | Al/V+Ti |
| 1 | 2.73 | 10.0 | 0.19 | 0.010 | 5.2 |
| 2 | 2.73 | 10.0 | 0.204 | 0.0083 | 5.2 |
| 3 | 2.73 | 10.0 | 0.19 | 0.010 | 6.0 |
| 4 | 2.73 | 10.0 | 0.19 | 0.010 | 5.2 |

The results obtained from the calculations and analyses are as set forth in Table IV.

TABLE IV

| Example No. | Rate | Efficiency | Conversion | | $C_2$ polymer comp. | I.V. | $M_L$ |
|---|---|---|---|---|---|---|---|
| | | | $C_2$ | $C_3$ | | | |
| 1 | 1,261 | 420 | 92 | 17 | 60.0 | 3.1 | 46 |
| 2 | 1,120 | 450 | 86 | 14 | 63.1 | 3.3 | 53 |
| 3 | 735 | 368 | 85 | 14 | 63.1 | 3.1 | 57 |
| 4 | 745 | 372 | 85 | 14 | 62.3 | 3.1 | 58 |

From Examples 1–4 as tabulated in Tables II and IV, it will be apparent that the reaction may be carried out at various conditions. It will also be noted from Table IV that good conversion yields of ethylene may be obtained.

The product of Example 1, which is typical of the polymer compositions prepared in accordance with the process of this invention, was compounded by mixing with the following formulations:

TABLE V

| | Parts |
|---|---|
| Polymer | 100 |
| FEF Carbon Black | 100 |
| MT Carbon Black | 100 |
| Flexon 886 Blend of Extender Oil | 120 |
| Stearic Acid | 1 |
| Zinc Oxide | 5 |
| TMTDS (tetramethyl thiuram disulfide) | 3 |
| MBT (mercaptobenzothiazole) | 0.5 |
| Sulfur | 1.5 |

The so-mixed formulation may be blended in a Banbury mixer and then cured for 20 minutes at 320° F. and tested in standard manner. The products of this invention, when tested against the Nordel brand of ethylene-propylene copolymer (a comparable brand presently marketed) as a control, may be found to possess the properties set forth in Table VI as follows:

TABLE VI

| | Control | Example 1 |
|---|---|---|
| $M_L$ | 40 | 46 |
| Wt. percent $C_2$ | 59.0 | 60.0 |
| V/Ti mole ratio | | 2 |
| Physical properties: | | |
| Tensile, p.s.i. | 1,200 | 1,490 |
| Elongation, percent | 305 | 330 |
| 300% modulus | 1,180 | 1,410 |
| Garvey extrusion, inches/min | 83 | 83 |

The products of Examples 2, 3 and 4 were compounded by mixing with the formulations of Table V except that 100 parts of MT carbon black was omitted. The properties noted, including those of a control Vistalon 4608 brand (a commercially available product) are as set forth in Table VII.

TABLE VII

| | Control | Example No. | | |
|---|---|---|---|---|
| | | 2 | 3 | 4 |
| $M_L$ | ~60 | 53 | 57 | 58.5 |
| Wt. percent $C_2$ | ~60 | 63 | 63 | 62 |
| ENB | ~3.0 | ~3.0 | ~3.0 | ~3.0 |
| Physical properties: | | | | |
| Tensile, p.s.i. | 1,840 | 1,800 | 1,900 | 1,950 |
| Elongation, percent | 480 | 420 | 450 | 490 |
| 300% modulus | 1,030 | 1,230 | 1,170 | 1,100 |
| Garvey extrusion, inches/min | 73 | 79 | 76 | 77 |

From Table VI it will be apparent (comparing the control prior art with Example 1 carried out in accordance with the instant invention) that the products are comparable products in that they have essentially the same percent ethylene. However, inspection of the measured physical properties clearly reveals that the tensile strength of applicant's novel product may be 10% to 25% higher than that of the control prior art product. Similarly, the elongation of applicant's novel product may be 5% to 10% greater than that of the control prior art product. More unexpectedly, however, is the fact that it is possible to simultaneously increase both the tensile strength and the percent elongation. Prior attempts to increase one of these properties normally results in a decrease in the other.

Also apparent is the fact that the 300% modulus, which is a measure of the strength of the product, may be increased by roughly the same order of magnitude as the improvement in tensile strength. It is unexpectedly also found that the rate of extrusion may be increased by a factor of as much as 10%, this being a very significant commercial factor.

Inspection of Table VII also reveals that using the novel technique of the instant invention, it is possible to achieve satisfactory results including increased tensile strength.

Results comparable to the above may be obtained by using other catalyst systems falling within the scope of this invention, for example:

(a)
vanadium tetrachloride
tetrabutyl titanate
carbon tetrachloride (b)
vanadium tetrachloride
tetrabutyl titanate
dichlorobenzene (c)
vanadium tetrabromide
tetrabutyl titanate
chloroform (d)
vanadium tetrachloride
tetrapropyl titanate
methylene dichloride Although this invention has been illustrated by reference to specific embodiments, it will be apparent to those skilled in the art that various changes and modifications may be made which clearly fall within the scope of this invention.

What is claimed is:

1. A process for preparing a copolymer of ethylene and a $C_3$ to $C_{10}$ higher alpha olefin which comprises:
   (a) forming a charge mixture of ethylene and a $C_3$ to $C_{10}$ higher alpha olefin;
   (b) forming, in a halogenated hydrocarbon solvent which is essentially free of water and oxygenated compounds and which has a boiling point above about 30° C., in the absence of cocatalyst, a catalyst mixture consisting essentially of from 1–10 moles of $VX_4$ wherein X is a halide having an atomic number greater than 9, and from 0.5–5 moles of $Ti(OR)_4$ wherein R is an alkyl hydrocarbon moiety having from 1 to 10 carbon atoms, thereby forming a catalyst component;
   (c) contacting said charge mixture with a catalytic amount of (i) said catalyst component in said halogenated hydrocarbon solvent and of (ii) as cocatalyst, a compound $R'_aAlY_{3-a}$ wherein R' is a hydrocarbon moiety, $a$ is an integer 1–3; and Y is a halide having an atomic number greater than 9; the molar ratio of the aluminum compound to the vanadium-titanium component being from 0.5–50;
   (d) copolymerizing said charge mixture at a temperature in the range of about $-10°$ C. to 100° C. and at a pressure in the range of about 0 to 1000 p.s.i.g., thereby forming a copolymer of ethylene and a $C_3$–$C_{10}$ alpha olefin; and
   (e) withdrawing said copolymer as product.

2. The process claimed in claim 1 wherein said halogenated hydrocarbon solvent is selected from the group consisting of carbon tetrachloride, chloroform, chlorobenzene, tetrachloroethylene, and mixtures thereof.

3. The process claimed in claim 1 wherein said halogenated hydrocarbon solvent has a melting point below about 10° C.

4. The process claimed in claim 1 wherein said halogenated hydrocarbon solvent is chlorobenzene.

5. The process claimed in claim 1 wherein said halogenated hydrocarbon solvent is carbon tetrachloride.

6. The process claimed in claim 1 wherein said halogenated hydrocarbon solvent is chloroform.

7. The process claimed in claim 1 wherein said halogenated hydrocarbon solvent is tetrachloroethylene.

8. A process for preparing a curable, elastomeric copolymer of ethylene and a $C_3$ to $C_{10}$ alpha olefin which comprises:
   (a) forming a charge mixture of ethylene and a $C_3$ to $C_{10}$ higher alpha olefin;
   (b) forming, in a halogenated hydrocarbon solvent selected from the group consisting of carbon tetrachloride, chloroform, chlorobenzene, tetrachloroethylene and mixtures thereof, in the absence of cocatalyst, a catalyst component consisting essentially of from 1–10 moles of vanadium tetrachloride and from 0.5–5 moles of tetrabutyl titanate;
   (c) contacting said charge mixture with a catalytic amount of (i) said catalyst component in said halogenated hydrocarbon solvent and of (ii) as cocatalyst, a compound $R'_aAlY_{3-a}$ wherein R' is a hydrocarbon moiety, $a$ is an integer 1–3, and Y is a halide having an atomic number greater than 9; the molar ratio of the aluminum cocatalyst to the vanadium-titanium component being from about 2–20;
   (d) copolymerizing said charge mixture at a temperature in the range of about $-10°$ C. to 100° C. and at a pressure in the range of about 0 to 1000 p.s.i.g., thereby forming a copolymer of ethylene and a $C_3$–$C_{10}$ alpha olefin; and
   (e) withdrawing said copolymer as product.

9. A catalyst component consisting essentially of from 1 to 10 moles of $VX_4$ and 0.5 to 5.0 moles of $Ti(OR)_4$ in a halogenated hydrocarbon solvent selected from the group consisting of carbon tetrachloride, chloroform, chlorobenzene, tetrachloroethylene and mixtures thereof, wherein X is a halide having an atomic number greater than 9 and R is an alkyl hydrocarbon moiety having from 1 to 10 carbon atoms.

10. A catalyst component as claimed in claim 9 wherein said $VX_4$ is vanadium tetrachloride and said $Ti(OR)_4$ is tetrabutyl titanate in said halogenated solvent, and the mole ratio of vanadium tetrachloride to tetrabutyl titanate is 2:1.

11. A catalyst component as claimed in claim 9 wherein said $VX_4$ is vanadium tetrachloride and said $Ti(OR)_4$ is tetrabutyl titanate in tetrachloroethylene and the mole ratio of vanadium tetrachloride to tetrabutyl titanate is 2:1.

12. A catalyst component consisting essentially of $$VX_4 \cdot bTi(OR)_4 \cdot nA$$

wherein X is a halide having an atomic number greater than 9, R is an alkylhydrocarbon moiety having from 1 to 10 carbon atoms, $b$ is 0.1–5.0, $n$ is 0.5–3.0, and A is a halogenated hydrocarbon selected from the group consisting of carbon tetrachloride, chloroform, chlorobenzene, tetrachlorobenzene and mixtures thereof 13. A catalyst component consisting essentially of a solution in an excess of a halogenated hydrocarbon solvent A of $$VX_4 \cdot bTi(OR)_4 \cdot nA$$

wherein X is a halide having an atomic number greater than 9, R is an alkyl hydrocarbon moiety having from 1 to 10 carbon atoms, $b$ is 0.1–5.0, $n$ is 0.5–3.0, and said halogenated hydrocarbon A is selected from the group consisting of carbon tetrachloride, chloroform, chlorobenzene, tetrachloroethylene, and mixtures thereof.

References Cited

UNITED STATES PATENTS

| | | | |
|---|---|---|---|
| 3,218,266 | 11/1965 | Ludlum | 252—429 |
| 3,223,651 | 12/1965 | Tornqvist | 252—429 |
| 3,308,112 | 3/1967 | Ludlum | 260—94.9 |
| 3,328,381 | 6/1967 | Borman | 260—94.9 |
| 3,354,139 | 11/1967 | Vandenberg | 260—94.9 |
| 3,385,841 | 5/1968 | Bruton | 260—93.5 |

OTHER REFERENCES

Christman, D. L. & Keim, G. I.: Reactivities of Nonconjugated Dienes Used in Preparation of Terpolymers in Homogeneous Systems.

Macromolecules, vol. 1, No. 4, July–August 1968, pp. 358–363.

JOSEPH L. SCHOFER, Primary Examiner

R. S. BENJAMIN, Assistant Examiner

U.S. Cl. X.R.

260—80.78; 252—429 B and C

PO-1050
(5/69)

UNITED STATES PATENT OFFICE
CERTIFICATE OF CORRECTION

Patent No. 3,686,155          Dated August 22, 1972

Inventor(s)    Joseph Wagensommer

It is certified that error appears in the above-identified patent and that said Letters Patent are hereby corrected as shown below:

Column 1, in the heading, enter the designation --assignor to Esso Research and Engineering Company--

Signed and sealed this 1st day of May 1973.

(SEAL
Attest:

EDWARD M. FLETCHER, JR.        ROBERT GOTTSCHALK
Attesting Officer                Commissioner of Patents